(12) United States Patent
Schofield

(10) Patent No.: US 6,959,311 B2
(45) Date of Patent: Oct. 25, 2005

(54) DATA LOGGING METHOD, APPARATUS, SYSTEM AND COMPUTER PROGRAM

(75) Inventor: Andrew John Schofield, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 09/898,364

(22) Filed: Jul. 3, 2001

(65) Prior Publication Data

US 2002/0059275 A1 May 16, 2002

(30) Foreign Application Priority Data

Nov. 23, 2000 (GB) .............................................. 0028516

(51) Int. Cl.[7] .............................................. G06F 17/30
(52) U.S. Cl. ...................... 707/203; 707/201; 717/170
(58) Field of Search .................... 707/1–10, 100–104.1, 707/200–206; 711/152–153; 714/5, 20

(56) References Cited

U.S. PATENT DOCUMENTS

| | | | | |
|---|---|---|---|---|
| 5,247,672 A | * | 9/1993 | Mohan | 711/152 |
| 5,418,940 A | * | 5/1995 | Mohan | 714/5 |
| 6,067,550 A | * | 5/2000 | Lomet | 707/202 |
| 6,490,594 B1 | * | 12/2002 | Lomet | 707/200 |

* cited by examiner

Primary Examiner—Shahid Alam
Assistant Examiner—Jean Bolte Fleurantin
(74) Attorney, Agent, or Firm—Duke W. Yee; Jerry W. Herndon; Gerald H. Glanzman

(57) ABSTRACT

A technique of logging updates to a plurality of data records into discrete pages in non-volatile storage, wherein a page partially full of data is known as a partial page. Identical partial pages I and I+1 are established in the logging process as quickly as possible. Thereafter, in response to a data segment D larger than the remaining space of a most recent updated partial page I, D is partitioned into a first segment D1 sufficient to fill the remaining space of page I and a second data segment D2. Page I is updated with a first write operation to its present contents concatenated with D1, and identical partial pages containing D2 are created at I+1 and I+2 with a second write operation, whereby those pages become pages I and I+1 for the next logging operation.

6 Claims, 9 Drawing Sheets

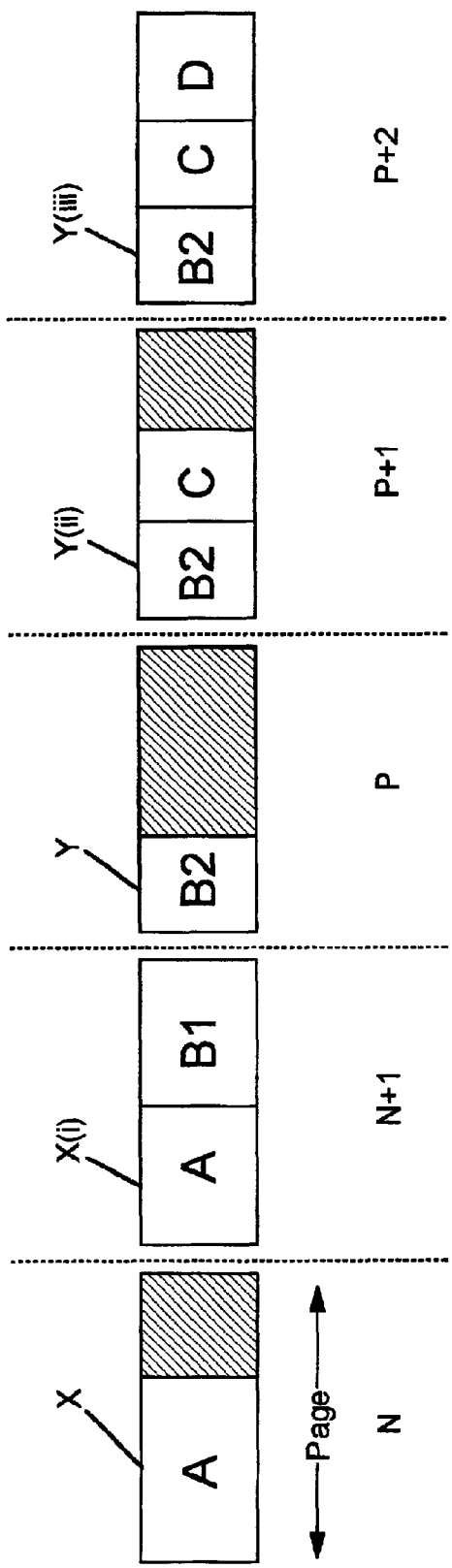

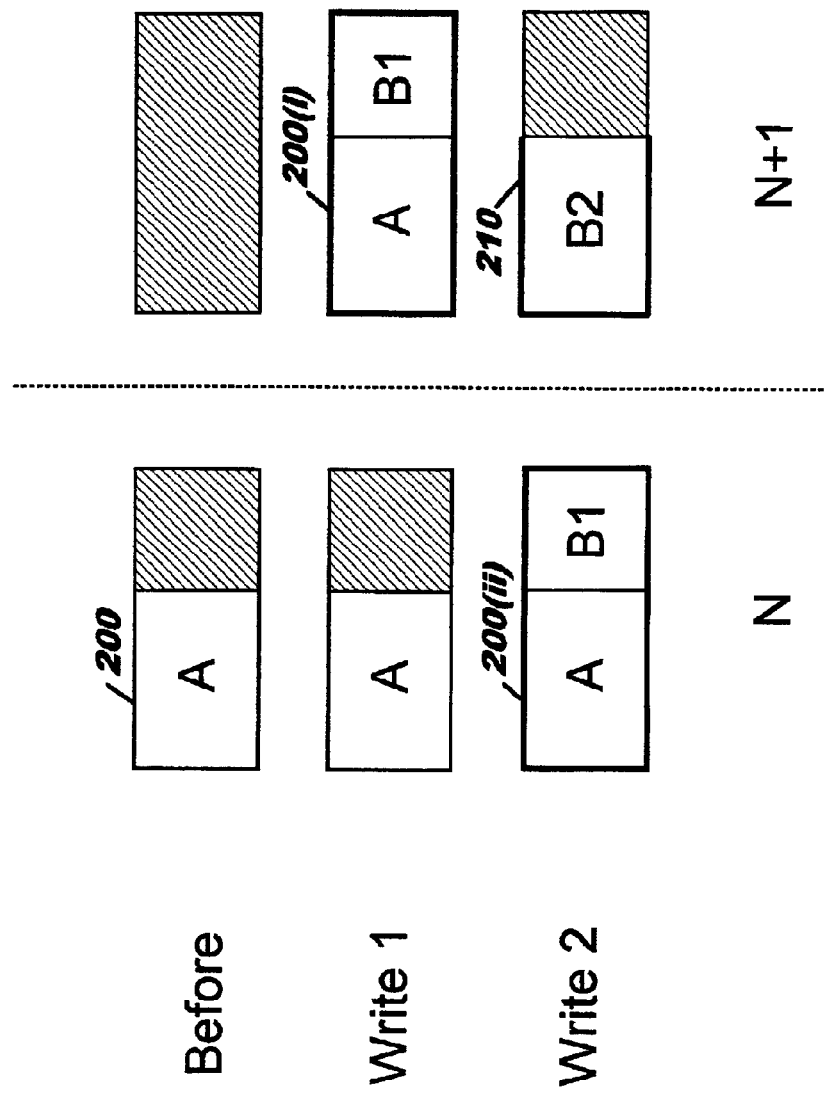

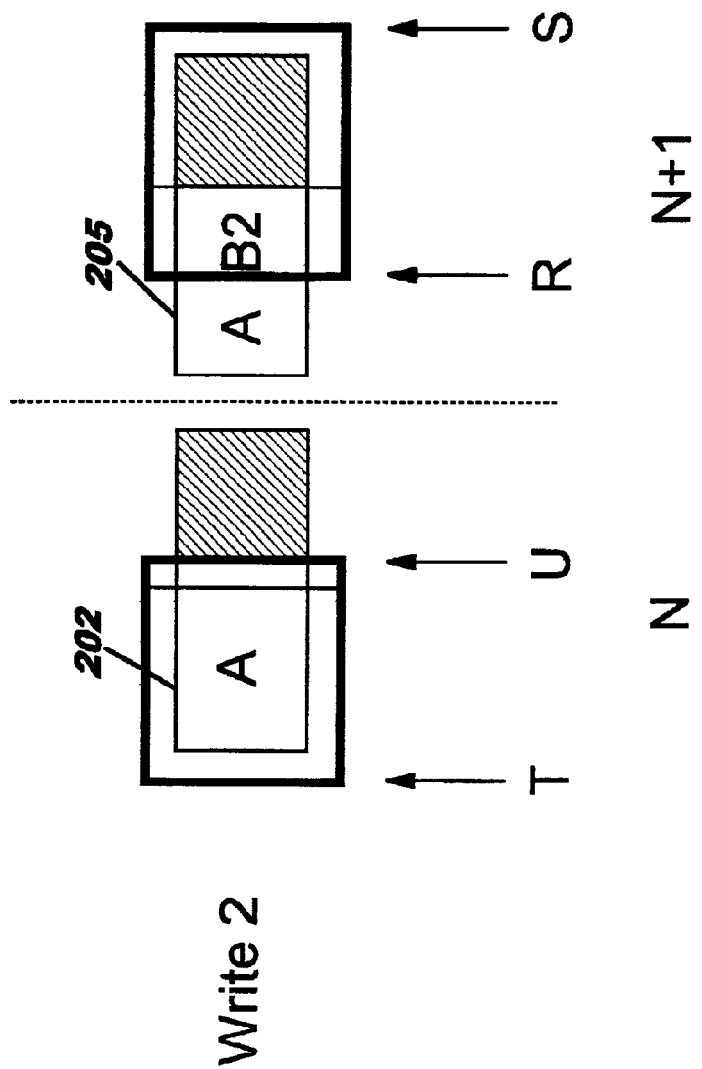

DATA LOGGING METHOD, APPARATUS, SYSTEM AND COMPUTER PROGRAM

The present invention relates to the field of data processing systems, and more particularly to the logging of data within such systems.

Many software systems that manage important data record all updates to non-volatile data in what's known as a log. FIG. 1 provides an overview of the process according to the prior art. A central server 10 holds some non-volatile data 20. A client 50 runs software 60 that causes some of the data 20 to be updated, for example, via a network connection to the server (not shown). The updated information is first stored in a buffer at the server (not shown) and at a predetermined point in time, the updated data is written out to a log 40. This, along with the buffering, is controlled by a log management component 45. The purpose of the log is to provide a high-integrity history of the data 20 and the operations upon it for recovery purposes. Note, the software for updating data 20 may run as a separate process at the server. Further the log 40 may sit across the network.

The logical view of the data in the log is of a sequence of records. New data is written to the end of the sequence and records are never changed once written. FIG. 2a shows an exemplary logical view of a log according to the prior art. In this example, there are three records A, B, C and these occupy one contiguous area of storage which grows from left to right (see time arrow).

The physical view is quite different. The data in the log is split into fixed-size blocks called pages, each of which is typically 4 Kilobytes in size. Records are tightly packed into the pages without any gaps between them. Page boundaries are overlapped where necessary. FIG. 2b shows an exemplary physical view according to the prior art. A page may consist of whole record(s) (A), a number of record fragments (B1, B2, C1, C2, C3), or a combination of the two. Record fragments correspond to those records that have been split across page boundaries. For example, it can be seen that C1, C2 and C3 constitute a record C. Note, each log record in the log is uniquely identified by a number called its Log Sequence Number (LSN). An LSN gives the byte offset of the start of a record from the beginning of the log, and so it is a simple matter to calculate the location of a log record given its LSN.

Typically, the last page in the log is only partly filled and is known as a partial page 100. When a new record is added to the log, it may fill a partial page with data and cause a new partial page to be added to the end of the log.

While it is true in the logical view of the log that data is only ever appended to the end of the log, in the physical view, this is not necessarily true and existing pages of log data can be overwritten. It is not possible to guarantee that all of the data in a page will be written atomically as a single operation and indivisible in any way. During the overwriting process, it is possible for the page to become corrupted. By way of example, a partial page contains a record fragment C3 as shown in FIG. 2b. A further write would cause that partial page to be overwritten with the C3 fragment and another record (D) or record fragment (D1) such that in the majority of cases, the page is filled. However, if the power is lost, for example, while the page is being overwritten then the page may be written incorrectly such that the C3 fragment is incomplete or not there at all.

It is therefore necessary to ensure that log records are not lost or corrupted unintentionally. One such method is to rely on fault-tolerant hardware, such as, for example, a SSA fast-write cache. This is a cache typically within a disk drive housing the log. When a server's operating system (o/s) issues a write to the disk drive this gets stored in the cache and control is relinquished back to the o/s for further transaction processing. The data can then be written out to disk asynchronously. Caching to volatile memory is disliked since it jeopardizes data integrity. This is because the o/s is fooled into believing that a transaction or transaction part has been recorded on disk when in reality this is yet to happen. If volatile memory fails then the data within is lost. A SSA fast-write cache however is battery backed (i.e. a power failure would not be a problem, since the batteries would simply take over). This kind of system is however extremely expensive and not cost effective in most commercial environments.

1Another method is illustrated by FIG. 3. It can be seen that each write starts a new page. Hence there is no chance of corrupting the most recent version of a page. Record A makes for a partial page X at position N. When the next data segment B arrives, the segment A from page N concatenated with B1 is written to N+1 and the remaining portion of B, which is B2, is written to page P in this example. The partial data segment B2 at page P again makes for a partial page when data segment C arrives and this is written to page P+1. A fuller version of that page Y(ii) is written to position P+1 and the complete version Y(iii) is written at position P+2 when data segment D arrives. What should be a single page of log data might therefore actually occupy more than one page of space in the log. This makes reading the log inefficient and it also makes it harder to manage the space requirements of the log. Housekeeping functions activated by the log management component typically determine that a particular page is redundant and available for overwriting (e.g. old versions of page Y(iii)). Note, the complete versions of pages may also be available for overwriting (i.e. if a checkpoint has been taken which includes those pages). However this method does mean that the log fills up more quickly and partial pages will be mixed in with full pages, both of which are undesirable. Further, it is not possible to predict the position of a particular log record via its LSN. Instead it would be necessary to scan the log each time a record was read or to hold some kind of directory information about the log records to locate a particular record. This is undesirable.

A careful-writing scheme or algorithm is therefore typically adopted to ensure that data that has already been written to the log is not corrupted by subsequent writes. The ping-pong algorithm is one example of such a scheme and is used, for example, by DB2 Universal Database, available from IBM Corporation. In this scheme, if there is a partial page of data at log page N when new data arrives, the contents of N concatenated with all or a portion of the new data is first written into N+1 to avoid the possibility of corrupting the data in N. Then the contents of N+1 are written into N. Finally, if there is a portion of the new data remaining not yet logged, that portion is written into N+1 to form a new partial page. As long as incoming data segments do not completely fill a page, the segments are added to N and N+1 in an alternating manner, ensuring that the previous, most recent version of data is not corrupted when the newer version is written. When the page is being read, it is necessary to check both in location N and location N+1 to determine the most recent version of data or to keep track of that in some other manner, such as by using a toggle flag. Either version of the page may be newer depending on how many times the page has been updated. When the page is finally filled, it is written to its own proper location N before the first version of the next page of the log can be written into the next location N+1. This scheme gives the advantage that you can calculate the location of a log record by its LSN.

Although data corruption is, in the main, prevented, a major disadvantage of the ping-pong scheme is efficiency. In this scheme, along with the other methods mentioned above, data is written directly to the log without caching by the central server's operating system or hardware (not shown in FIG. 1). So, when the log management component issues a request to the operating system to write data to the log, control is not returned to the log management component until the data is correctly recorded in a non-volatile medium. This is necessary since the server needs to know that data has been correctly written to the disk to ensure data integrity (see above). This also means that it is time-consuming to write data to the log because the cost of waiting for the relatively slow disk drive cannot be amortized across many write operations by use of a cache. Luckily, when most records are written to the log, they do not have to be recorded until a point of consistency such as the completion of a unit of work. However, the cost of writing to the log is still a major factor in the performance of many data systems. In striving to avoid the consequences of data corruption, the ping-pong scheme requires that when a page is first written as a partial page, the page is typically written three times before a page is completely full and data is in the proper sequence in the log FIG. 4 illustrates the operation of the ping-pong scheme and the performance problems associated with it. (Note, the pages with the thick borders indicate the data actually written by each disk write—this is also so in FIGS. 5, 10 and 11.) As previously mentioned, it is common for the last page in a log to be written as a partial page and for it to be filled via subsequent writes. Typically, the page is full by the time the second write has been completed. Thus in the FIG. 4, partial page 200 represents the "before" scenario in which a partial write of A has already been performed into N. A new record with fragment B1 makes for a full page 200(i), which is written (Write 1) to position N+1 such that there is no risk of overwriting the most recent version of the page 200 at position N. Write 2 subsequently copies the full version of the page 200(ii) from N+1 back to its expected location at position N. A third write writes the next partial page 210 (the remaining fragment B2 of B) into position N+1. The next page at position N+2 (not shown) then becomes available for the ping-pong pair for partial page 210.

Logically, it is unnecessary to write page 200(i) into position N+1, but this is required to ensure that the latest version of page 200 in position N is not corrupted by a write into that page with the only copy of update A. Similarly, it is not permitted to combine writes 2 and 3 into a single write since it is possible to corrupt the data in both locations N and N+1. (This would, however, make for a less I/O bound solution.) Such an invalid write operation is shown in FIG. 5. It can be seen that write 1 writes the full version of the page 200(i) to position N+1 (as in FIG. 4) and write 2 then writes this into position N and page 210 into position N+1. However, it is possible on this single Write 2 to corrupt both N and N+1.

Data is written out to disk a sector at a time. A disk sector is typically 512 bytes, whereas a page is typically 4 Kilobytes. Thus it is quite possible that data will not be written out from the beginning of a page. Further, disk drives commonly optimize the order of writing to match the position of the disk under the write head at the time that the request arrives in the disk drive. Since the sectors which have to be written to the disk drive are not therefore necessarily written in the order which one might expect, it is possible that only part of page 210 is written, followed by part of page 200(ii), followed by a power failure. If this happens then both page 200 and page 200(i) are corrupted and records lost. FIG. 6 illustrates this problem. In aiming to write the full version of page 200(ii) and partial page 210 in one write (write 2), the problem outlined above occurs. The write head begins writing at location R and continues up to location S. Note, location R is not at the beginning of partial page 210. Writing then starts again at location T and ends abruptly at location U due to, for example, a power failure. The logical view of the end of the log is as if page 200(ii) does not exist because both copies (200(i) and 200(ii)) of that page are either overwritten or corrupt. The data in location N contains a corrupted version 202 of page 200(ii). Location N+1 contains a corrupt page 205 consisting of some of page 200(ii) and some of page 210. There is no longer a good copy of page 200(ii) and so no way of recovering the information.

SUMMARY OF THE INVENTION

Accordingly, the invention provides a method for logging updates to a plurality of data records, wherein the updates are logged to an area of non-volatile storage and the storage area is divided into a plurality of discrete pages, wherein a page partially full of data is known as a partial page.

Identical partial pages I and I+1 are established at the earliest opportunity as part of the logging process. In response to a data segment D larger than the remaining space of a most recent updated partial page I, D is partitioned into a first segment D1 sufficient to fill the remaining space of page I and a second data segment D2. Page I is filled with a first write operation that contains its present contents concatenated with D1. In addition, identical partial pages I+1 and I+2 are created by writing D2 to them in a single, second write operation. The identical partial pages I+1 and I+2 become the identical partial pages I and I+1 for the next logging operation. Thus, the invention operates to update a log in the situation described in two write operations instead of three, as in the known ping-pong method.

It is possible to receive a succession of one or more data segments that do not fill a page or a partial page. In the preferred embodiment, in response to successive data segments D, the first of which is smaller than the remaining space of the most recently updated partial page I, page I+1 is written to the present contents of page I concatenated with D. Thereafter, this procedure is alternated between pages I and I+1 until a data segment X fills the remaining space of the page containing the most recent update. Then the string consisting of the most recent update concatenated with the new data segment X is partitioned into segments D1 and D2, wherein D1 is written into page I and D2 is written into both pages I+1 and I+2 in a single write operation as described above. In an alternative embodiment, in response to successive data segments X, the first of which is smaller than the remaining space of the most recently updated partial page I, page I+1 is written to the present contents of page I concatenated with X. Thereafter, this procedure is continued into successive pages I+2, I+3, etc. until a data segment X fills the remaining space of the page containing the most recent update. Then, the most recent update concatenated with the new data segment X is partitioned into segments D1 and D2, wherein D1 is written into page I in a first write operation and D2 is written into both pages I+1 and I+2 in a second write operation.

The invention might advantageously be used in many types of software systems, including relational databases, reliable messaging systems (e.g. MQSeries available from IBM Corporation) and component transactions servers. For example, in a messaging system which provides once-and-once-only delivery semantics for messages sent between applications communicating across a network via the messaging system, the message data and control information for reliable message transmission could be recorded in a log. In such a system, performance tests indicate, according to the preferred embodiment, up to 20% increase in throughput for a simulation of a typical workload attributed to the disclosed optimization. (Note, in MQSeries for typical workloads it is rare for more than two partial versions of a particular page to be written before the page is filled.)

An additional advantage is that this optimization does not change the format of the log data or any logic not concerned directly with writing log records. It is therefore still possible, according to the preferred embodiment, to calculate the location of a log record given its LSN.

According to another aspect, the invention provides a computer program product comprising computer program code stored on a computer readable storage medium or a carrier wave containing computer program code which, when executed on a computer, performs the method described above.

BRIEF DESCRIPTION OF THE DRAWING

A preferred embodiment of the present invention will now be described, by way of example only, and with reference to the following drawings:

FIG. 3 illustrates a known method of ensuring that pages in a log are not unintentionally lost or corrupted;

FIG. 5 shows a variation on the ping-pong scheme, where data integrity is compromised by combining two write operations into a single write;

FIG. 6 shows one way the data integrity is compromised by the single write variation of the ping-pong scheme of FIG. 5;

DETAILED DESCRIPTION

According to a preferred embodiment, the present invention provides an optimized ping-pong algorithm. The modified algorithm optimizes the typical case in which a partial page remains after a performing a logging operation. For all other situations the number of writes required to create a proper log is preferably the same as for the un-optimized ping-pong algorithm.

Figure 1:
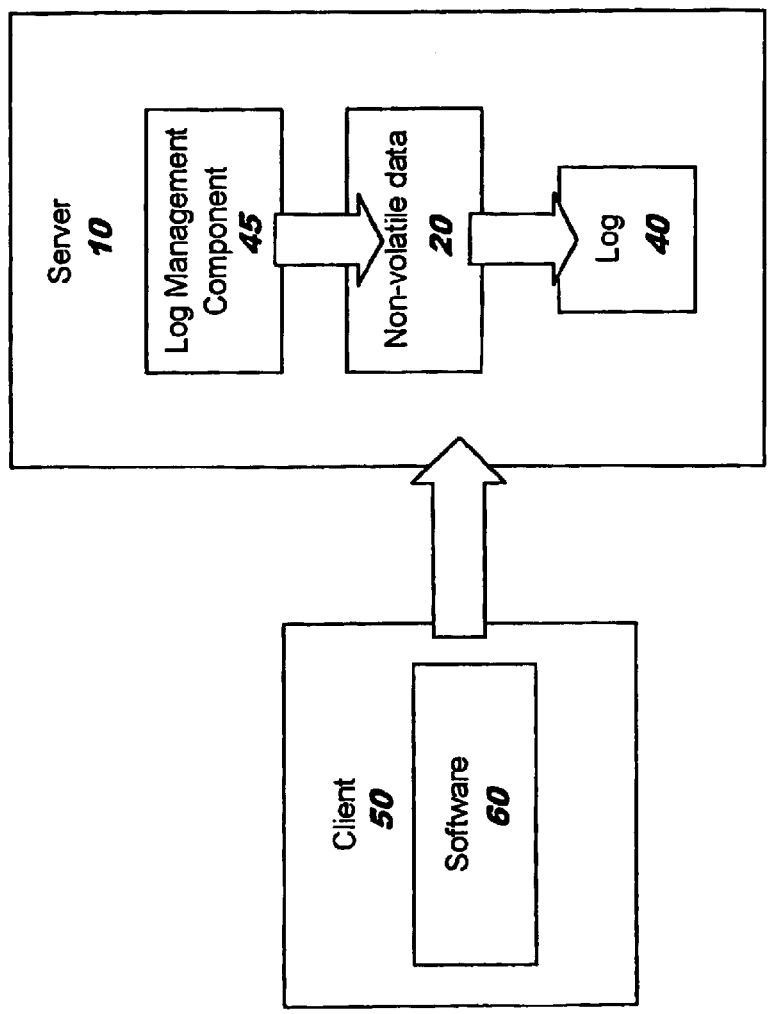
FIG. 1 shows an overview of logging according to the prior art.
Figure 2A:
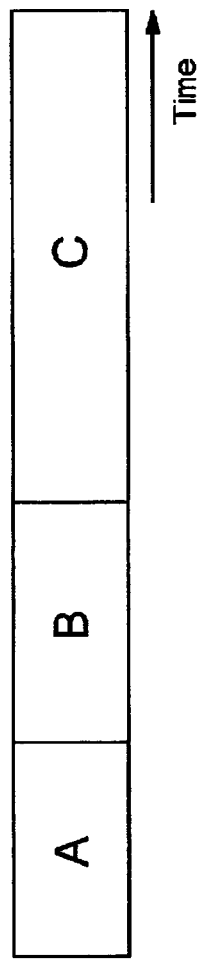
FIG. 2a shows the logical view of the records in a log.
Figure 2B:
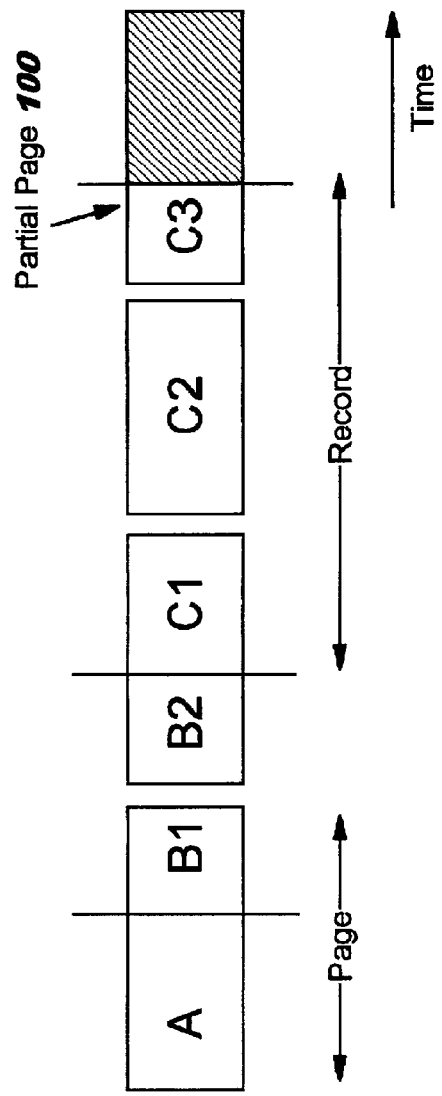
FIG. 2b shows the physical view of the records in a log.
Figure 4:
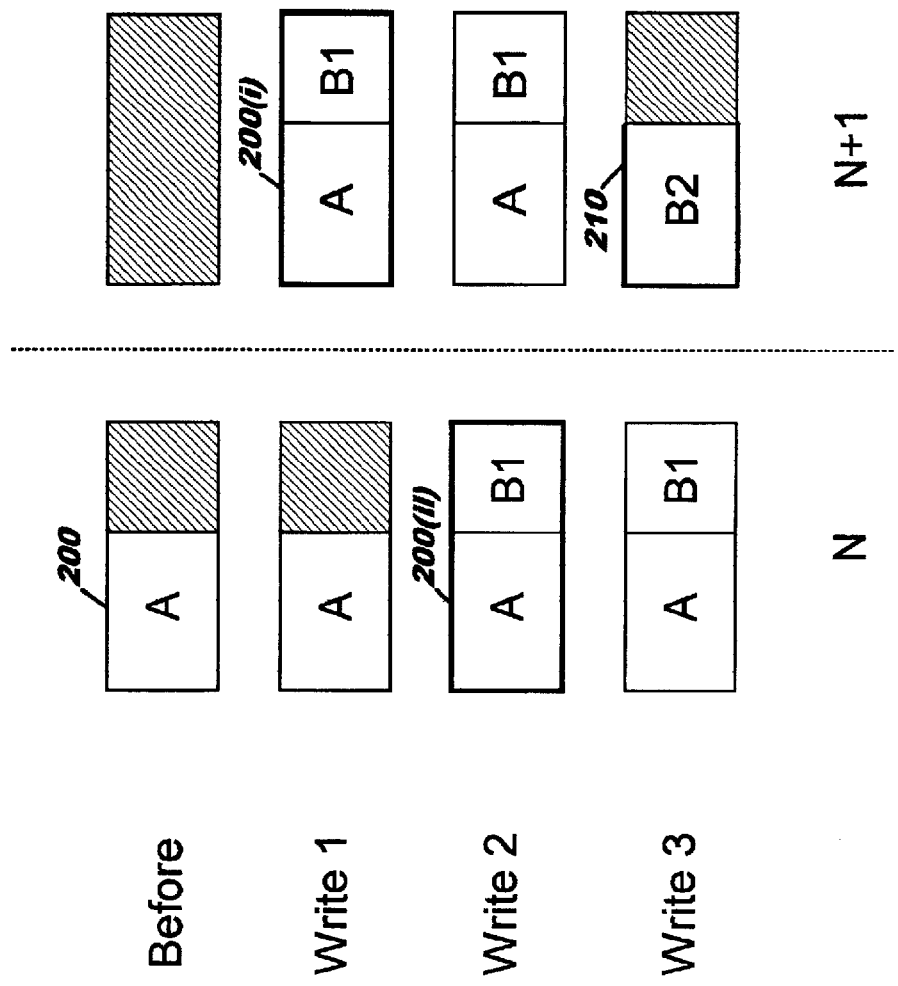
FIG. 4 illustrates another known logging method referred to as the ping-pong scheme.
Figure 9:
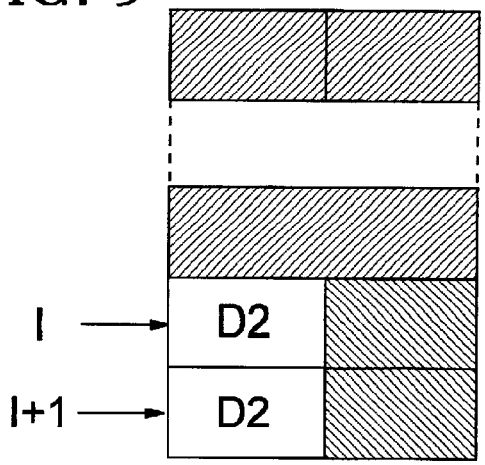
FIG. 9 illustrates a log after a partial page has been written into two consecutive log pages in accordance with the invention.
Figure 7:
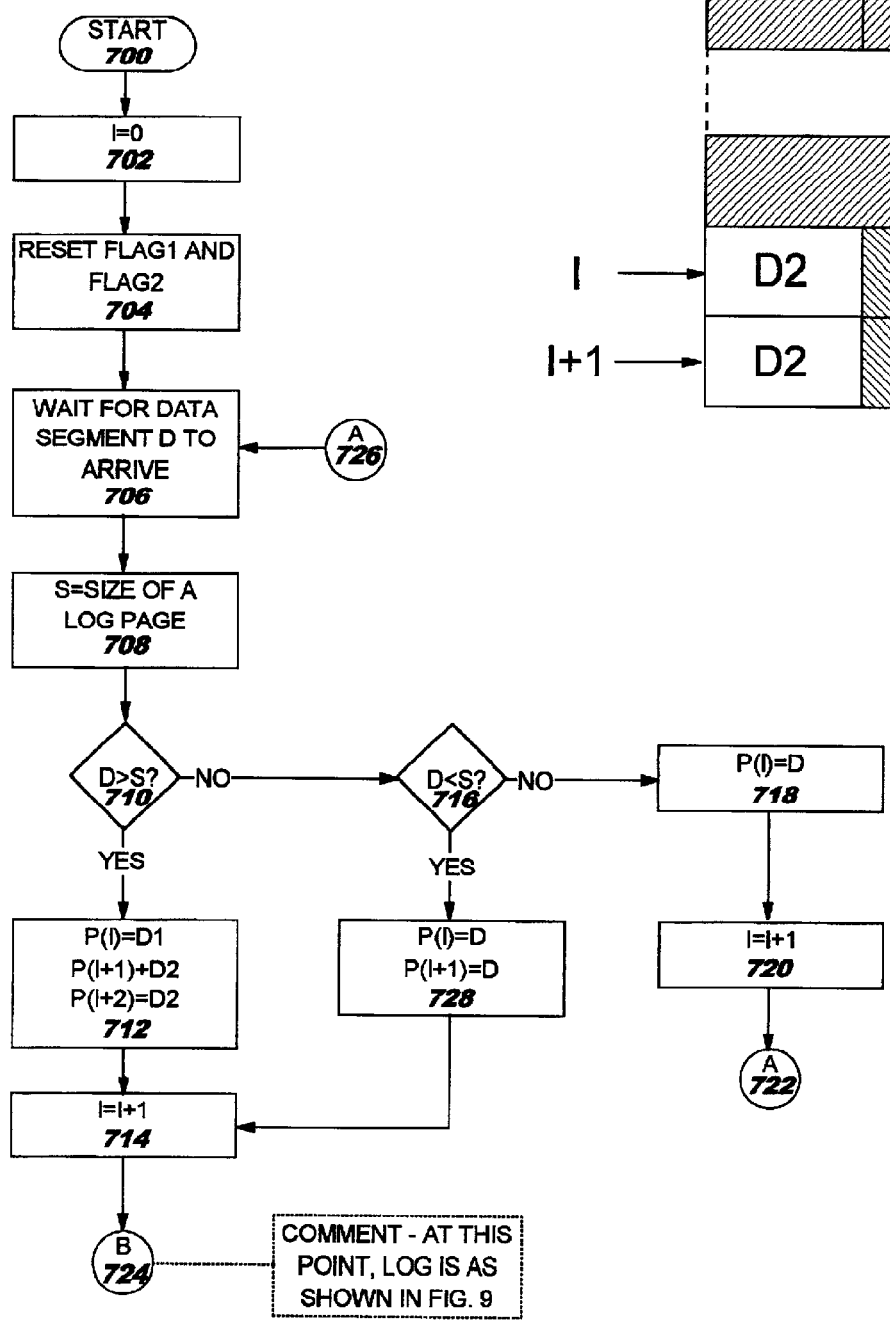
FIGS. 7 and 8 illustrate with flowcharts the operation of the present invention according to a preferred embodiment.
Figure 8:
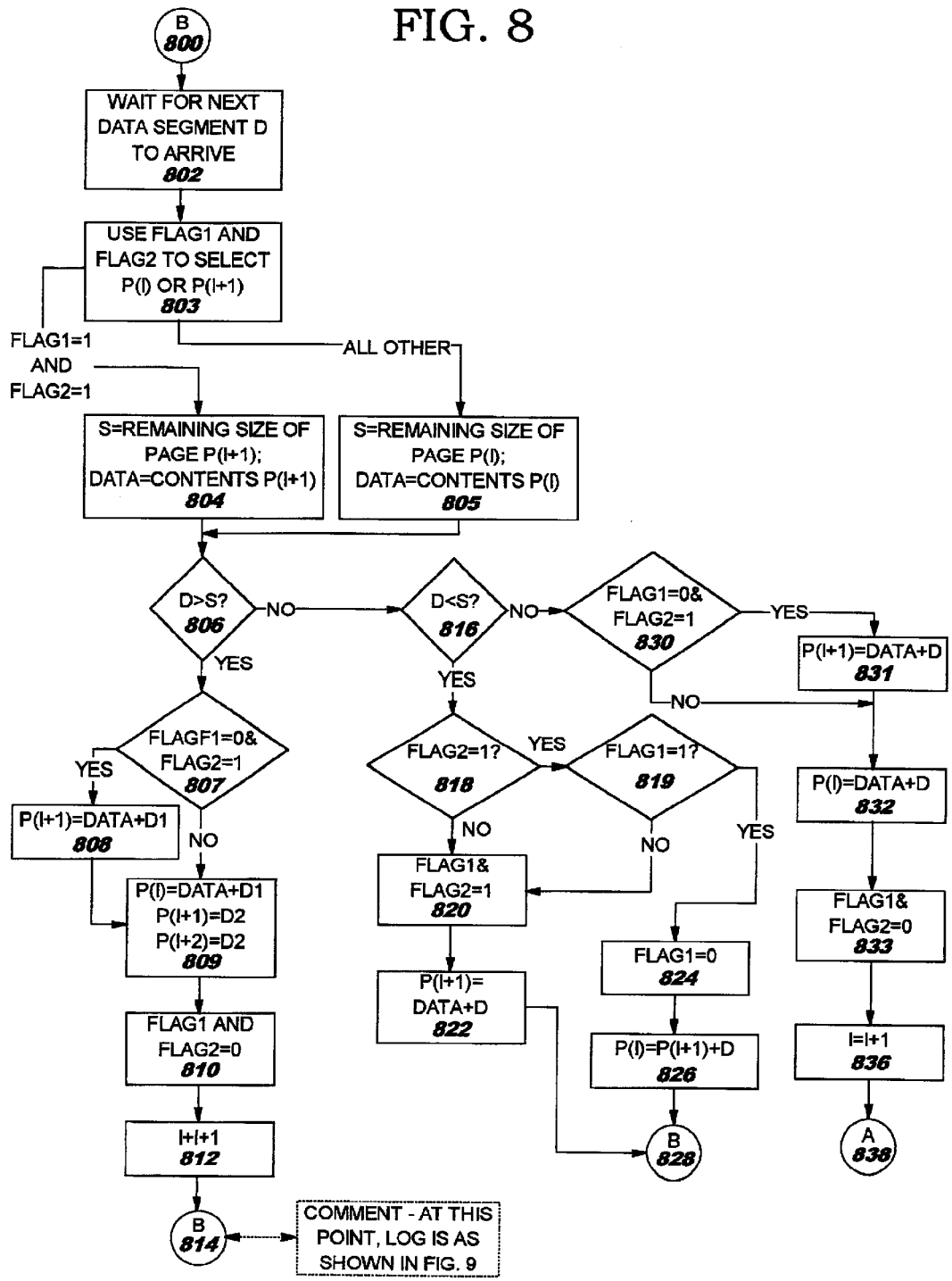
Figure 10:
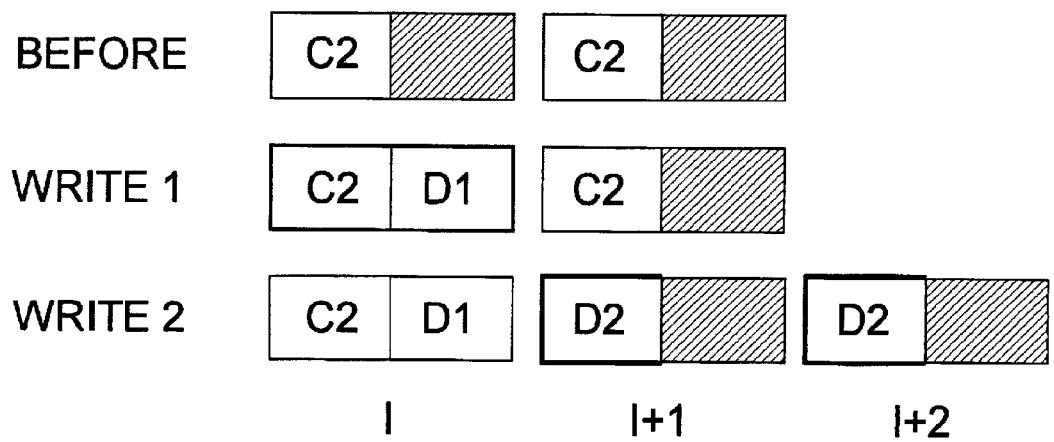
FIGS. 10 and 11 illustrate two examples of log operations as an aid to the understanding of the flowchart of FIGS. 7 and 8.
Figure 11:
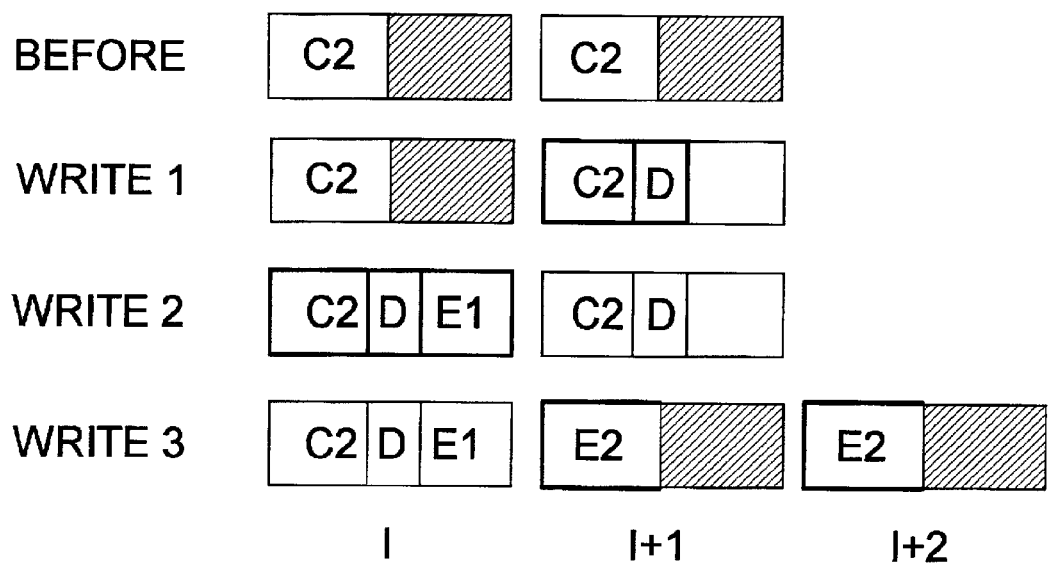

FIGS. 7 and 8 are flowcharts of the operation of the present invention according to a preferred embodiment. They should be read in conjunction with FIGS. 9, 10 and 11 which show the format of log records written out for two illustrative conditions. FIGS. 9 and 10 shows the typical case in which the previous log operation created identical partial pages at N and N+1 and the present log operation typically creates the same situation in two writes of the log instead of three writes, as in the prior art. FIG. 11 illustrates the situation in which one or more updates do not fill a partial page. In this situation, locations I and I+1 are used alternately to store the updates until an update results in filling the most recent partial page. After that operation, the typical case of two identical and consecutive partial pages is re-established, as per FIG. 10.

The algorithm starts at step 702 where the loop variable I is initialized to zero. Step 704 resets variables FLAG1 and FLAG2. FLAG2 is used to signal that the most recent update did not fill a partial page and a state is in effect of alternately using pages I and I+1 to log updates until a page is completely filled. When this state is in effect, FLAG1 keeps track of which page I or I+1 was used for logging the last update. This is described fully below at the appropriate point. Step 706 waits for a data segment D to arrive for logging. When it does, step 708 sets variable S to the size of a log page. Step 710 determines if the size of the incoming data segment D is greater than the page size in S. If the answer is yes, step 712 divides D into two parts, D1 that fits into the page pointed to by I (I is zero at this point) and the remainder D2; step 712 stores D1 into page P(I) in a first write operation. Step 712 also uses a single second write operation to store D2 into the next two page locations I+1 and I+2, thereby creating two identical partial pages at these locations. The single write is made possible by filling a write buffer with D2, followed by fill data for the remainder of page I+1, followed by D2 again for page I+2. At this point, the algorithm has created the "Before" situation shown in FIGS. 10 and 11. Step 714 increments I and goes to entry B in FIG. 8.

If the first data segment D does not fill a page, step 716 determines if its size is less than a page. If it is, step 728 writes the entire segment D into P(i) and P(I+1) in a single write operation. Again, this creates the "Before" case of FIGS. 10 and 11. Step 714 is executed to increment I and go on to B in FIG. 8.

If neither steps 710 or 716 are satisfied, then the size of D must equal exactly that of a log page. In this case, step 718 stores D in P(I) and step 720 increments I. Since there is no resulting partial page, the situation is equivalent to the beginning when I was zero. Therefore, control is returned at 722 to entry A at 726 to continue this introductory part of the algorithm until two consecutive partial pages are created.

The above process continues until a log operation results in the creation of two consecutive identical partial pages. Normally this happens very quickly. When it does, control is passed at step 724 to entry B in FIG. 8. FIG. 9 illustrates the state of the log at this time, where the upper dark hatched pages represent zero, one or a small number of initial log operations that occurred before creating the partial pages containing D2 at I and I+1.

With reference now to FIG. 8, step 802 waits for the arrival of the next data segment D. When it arrives, a determination must be made as to the size of the space remaining in the page to be used in logging this data. This page can be I or I+1 depending on the state of affairs. If FLAG2 is 1, the state of alternately using pages I and I+1 to log operations is in effect and FLAG1 keeps track of which page I or I+1 has the most recent update. If FLAG1 is 1, then page I+1 contains the most recent update; otherwise page I contains the most recent update. If both FLAG1 and FLAG2 are set to 1, step 804 sets S equal to the size of the remaining space of page I+1 and it sets the variable DATA to the contents of page I+1. In all other cases, step 805 sets S equal to the size of the remaining space of page I and DATA to the contents of page I. Step 806 now determines if the size of D is greater than S. If so, then the present operation will fill the present page with a partial segment D1 and leave a remainder segment D2. Step 807 first determines which page (I or I+1) contains the last update. If FLAG1=0 and FLAG2=1, then page I contains the last update. To protect the last update, the next write must be to page I+1. Therefore, in this case, step 808 sets page I+1 to the concatenation of the DATA (the last update) and D1. If that write is successful, step 809 next sets page I to DATA concatenated with D1. The log is now in a proper sequence. Step 809 also in a third write establishes identical partial pages I+1 and I+2 by setting them to D2 in a single write operation. Returning to step 807, if the question there is not satisfied, then page I+1 contains the most recent update. In this case, there is no reason to perform step 808. Rather, step 809 fills the present page I with DATA concatenated with D1 and it also establishes with a single second write the identical partial pages I+1 and I+2 set to D2. The result is shown in FIG. 10, in which BEFORE represents the state of the log before D arrived, C2 concatenated with D1 is written into page I in a first operation, and if that write is successful, D2 is written into both pages I+1 and I+2 in a second write operation.

At step 806, if the size of the data segment D is not greater than the value in S, then step 816 determines if it is less than S. If so, a portion of the algorithm is now begun in which the consecutive partial pages I and I+1 are used to log operations safely until an operation occurs that fills the most-recent updated page. An example of this is shown in FIG. 11. Step 818 determines if FLAG2 is already set. If not, this is the first iteration in which an update does not fill the present page. In this case step 820 sets both FLAG1 and FLAG2 TO 1; step 822 uses page I+1 to store the present contents DATA (the contents of page I) concatenated with the data segment D. Write 1 of FIG. 11 shows this operation in which segment D, which does not fill partial page I, is added to page I+1 in a single write operation. The variable I is not incremented because a new page has not been filled by this operation. Control is then passed to entry B to await the next data segment.

Continuing with this last example, when the next segment D arrives, it may also be of such a size that it still does not fill the remaining contents of page I+1. In this case, step 804 will set S to the remaining size of the page I+1, and step 816 will be satisfied. Since FLAG2 is already set as well as FLAG1, step 824 will reset FLAG1 to 0 and step 826 will store in page I (page I+1 was last used) the value of DATA concatenated with D. This scenario of alternately using I and I+1 to log updates will continue until an update results in at least filling the page I or I+1 that contains the last update. Write 2 of FIG. 11 gives an example of this operation, in which a portion E1 of the next segment E to arrive fills the remaining space of the most recent update (page I+1 in this example). Therefore, in this example, the concatenation of the most recent update (C2 and D) and E1 is written into I on Write 2. At this time, step 808 will re-establish the state of FIG. 10 in which page I is completely filled and pages I+1 and I+2 contains identical partial pages. Write 3 of FIG. 11 illustrates this, in which the remaining portion E2 of E is written into I+1 and I+2 in a single write. It is also possible, of course, that page I becomes exactly filled (there is no partial page), in which case the following occurs.

If when logging a data segment, the update exactly fills the remaining space in page I (or in page I+1 if the FLAG2 state is in effect and page I+1 was last updated), then both steps 806 and 816 fail. Step 830 determines which page I or I+1 contains the last update. If its page I, then step 831 writes page I+1 to the concatenation of DATA and new data segment D and step 832 then writes page I to the same value. If page I+1 contains the most recent update, step 831 is omitted for the same reason as described earlier with reference to step 807. Page I is now filled and there is no new partial page. Therefore, the algorithm is essentially re-started as if the next page were the initial page. Step 833 resets both flags FLAG1 and FLAG2. Step 836 increments I and return is made at 838 to entry A in FIG. 7 to continue the process.

According to the preferred embodiment, when incoming segments D don't completely fill a partial page, then pages I and I+1 are used alternately to store each successive segment with the last saved state until a page is filled. It should be recognized that successive pages, i.e. I+1, then I+2 and so on, can be used for the same purpose instead of I and I+1. In other words, I might contain D1, I+1 might contain D1+D2, I+2 might contain D1+D2+D3, where all of the D's represent successive data segments that individually and concatenated do not fill a page. Eventually when an update does fill a page, the most recent page concatenated with the new segment is written to I and the process is then re-initialized to start again.

According to the preferred embodiment, the invention trades the cost of writing a duplicate copy of the last page of the log against the cost of a third disk write in the common case where the last page of the log is written once as a partial page and then the next time as a full page. It is common for only one version of a partial page to be written, before the page is overwritten with a full version and so the optimization is an important one. An additional advantage is that this optimization does not change the format of the log data or any logic not concerned directly with writing log records.

Examples of software systems which could use a log include relational databases, reliable messaging systems (e.g. MQSeries available from IBM Corporation) and component transactions servers. For example, in a messaging system which provides once-and-once-only delivery semantics for messages sent between applications communicating across a network via the messaging system, the message data and control information for reliable message transmission could be recorded in a log. In such a system, performance tests indicate, according to a preferred embodiment, up to 20% increase in throughput for a simulation of a typical workload attributed to the optimization disclosed.

Throughout the present application writing/adding to the end of the log has been referred to. It is to be understood that the end of the log, may actually constitute the next available location, which could, for example, be at the beginning of the log if the log has been filled and has wrapped round (e.g. in circular logging) or the next suitable position which is not necessarily the next available location. Housekeeping functions preferably determine which pages are available for overwriting. Further, a partial page is not always written. A full page may be written at a first attempt.

What is claimed:

1. A method for logging updates to a plurality of data records into discrete pages in non-volatile storage, wherein a page partially full of data is known as a partial page, said method comprising the steps of:

establishing identical partial pages I and I+1 at the earliest opportunity, in response to a data segment D larger than the remaining space of a most recent updated partial page I, partitioning D into first segment D1 sufficient to fill the remaining space of page I and a second data segment D2, filling page I with a first write operation of it present contents concatenated with D1, and creating identical partial pages I+1 and I+2 with a single, second write operation of D2 to both pages, whereby pages I+1 and I+2 become the new pages I and I+1 for the next logging operation, wherein in response to successive data segments D, the first of which is smaller than the remaining space of the most recently updated partial page I, writing page I+1 to the present contents of page I concatenated with D, and thereafter alternating this procedure between pages I and I+1 until a data segment X fills the remaining space of the page containing the most recent update, and at that point writing page I to the value of the most recent update concatenated with the new segment X in a first write operation and writing any remaining part of segment X into both pages I+1 and I+2 in a second write operation.

2. The method of claim 1 comprising the step of:

in response to successive data segments D, the first of which is smaller than the remaining space of the most recently updated partial page I, writing I+1 to the present contents of page I concatenated with D, and the after continuing this procedure into successive pages I+2, I+3, etc. until a data segment X fills the remaining space of the page containing the most recent update, and at that point writing page I to the value of the most recent update concatenated with the new segment X in a first write operation and writing any remaining part of segment X into both pages I+1 and I+2 in a second write operation.

3. A storage medium for storing computer program instructions that when loaded into a computer performs the steps of claim 1.

4. A carrier wave containing computer program instructions that when loaded into a computer performs the steps of claim 1.

5. Apparatus for logging updates to a plurality of data records into discrete pages in non-volatile storage, wherein a page partially full of data is known as a partial page, comprising:

means for establishing identical partial pages I and I+1 at the earliest opportunity;

means responsive to a data segment D larger than the remaining space of a most recent updated partial page I for partitioning D into a first segment D1 sufficient to fill the remaining space of page I and a second data segment D2, means for filling page I with a first write operation to its present contents concatenated with D1, and means for updating with a second write operation both pages I+1 and I+2 to D2, whereby pages I+1 and I+2 become the new pages I and I+1 for the next logging operation, wherein means responsive to successive data segments D, the first of which is smaller than the remaining space of the most recently updated partial page I for writing page I+1 to the present contents of page I concatenated with D, and means for thereafter alternating this procedure between pages 1 and I+1 until a data segment X fills the remaining space of the page containing the most recent update, and means for writing page I to the contents of the page containing the most recent update concatenated with the last received data segment X.

6. The apparatus of claim 5 further comprising:

means responsive to successive data segments D, the first of which is smaller than the remaining space of the most recently updated partial page I for writing page I+1 to the present contents of page I concatenated with D, and means for thereafter continuing this procedure into successive pages I+2, I+3, etc. until a data segment X fills the remaining space of the page containing the most recent update, and means for writing page I to the contents of the page containing the most recent update concatenated with the last received data segment X.

* * * * *

UNITED STATES PATENT AND TRADEMARK OFFICE
CERTIFICATE OF CORRECTION

PATENT NO. : 6,959,311 B2
DATED : October 25, 2005
INVENTOR(S) : Andrew John Schofield It is certified that error appears in the above-identified patent and that said Letters Patent is hereby corrected as shown below:

Column 9,
Line 25, replace "the after" with -- thereafter --.

Column 10,
Line 23, replace "1" with -- I --.

Signed and Sealed this

Seventeenth Day of January, 2006

JON W. DUDAS
*Director of the United States Patent and Trademark Office*